United States Patent [19]
Kondo et al.

[11] Patent Number: 5,053,877
[45] Date of Patent: Oct. 1, 1991

[54] AUTOMATIC GAIN CONTROL CIRCUIT FOR USE IN A TELEVISION CAMERA

[75] Inventors: Toshiharu Kondo, Kanagawa; Takashi Kohashi, Chiba, both of Japan

[73] Assignee: Sony Corporation, Tokyo, Japan

[21] Appl. No.: 527,890

[22] Filed: May 24, 1990

[30] Foreign Application Priority Data

May 30, 1989 [JP] Japan .................................. 1-137242

[51] Int. Cl.$^5$ ........................ H04N 5/238; H04N 3/14; H04N 5/335; H04N 5/30
[52] U.S. Cl. ............................... 358/228; 358/213.19; 358/211
[58] Field of Search ................. 358/228, 213.19, 209, 358/909, 211, 225

[56] References Cited

U.S. PATENT DOCUMENTS

| | | | |
|---|---|---|---|
| 4,516,172 | 5/1985 | Miyata et al. | 358/228 |
| 4,734,777 | 3/1988 | Okino et al. | 358/228 |
| 4,843,476 | 6/1989 | Fujioka et al. | 358/213.19 |
| 4,969,045 | 11/1990 | Haruki et al. | 358/227 |

Primary Examiner—Howard W. Britton
Assistant Examiner—Wendy R. Greening
Attorney, Agent, or Firm—Alvin Sinderbrand; William S. Frommer

[57] ABSTRACT

Apparatus is provided for controlling the aperture of an iris in a camera, such as a television camera. Samples of an image signal produced during a predetermined interval that have magnitudes greater than a threshold level are counted, and the difference between this count and a predetermined count is determined. The aperture of the iris is controlled as a function of this difference.

14 Claims, 1 Drawing Sheet

AUTOMATIC GAIN CONTROL CIRCUIT FOR USE IN A TELEVISION CAMERA

BACKGROUND OF THE INVENTION

1. Field of the Invention

This invention relates to automatic iris control of a camera and, more particularly, to such automatic control as a function of the actual image signal level rather than the average image brightness level.

2. Description of the Prior Art

Automatic iris control devices are known for cameras, such as video cameras. The purpose of such devices is to increase the aperture of the iris when the brightness level of the image picked up by the camera is relatively low and to close, or reduce the aperture when that brightness level is relatively high.

Typically, the camera in which the automatic iris control device is used also is provided with an automatic gain control (AGC) circuit. The AGC circuit amplifies the signal derived from the picked up image with a gain that is inversely related to the image signal level. Thus, the gain of the AGC circuit is increased if the amplified image signal level is too low and the gain is decreased if that amplified image signal level is too high. Since automatic iris control and automatic gain control are provided in the same camera, the control circuits therefor generally are designed such that the aperture control feature has priority over the gain control feature. That is, first the aperture is controlled as a function of the image signal level and then the AGC circuit is controlled as a function of the level of the signal derived from the image which has passed through the controlled aperture.

In a typical automatic iris control circuit, the average image signal level is compared to a reference and any difference therebetween is used to open or close the iris accordingly. More particularly, if the average image signal level exceeds the reference, the iris aperture is reduced and, conversely, if the average image signal level is less than the reference, the iris aperture is increased. In this way, the overall light level of the object being imaged is used to control the iris. It is appreciated that a reduction in the iris aperture tends to reduce the average level of the image signal and, contrarily, an increase in the iris aperture tends to increase the average image signal level. Since the AGC circuit operates on the image signal whose level is a function of the iris aperture, the signal-to-noise ratio is improved by reason of this aperture priority. Of course, the gain of the AGC circuit is increased when the image signal is derived from a low-lighted object, even when the iris aperture is opened to its maximum.

In the conventional iris control device, the iris is driven by a motor to which a signal derived from the difference between the average image signal level and a reference is supplied. This feedback loop is designed to control the iris aperture such that the average image signal level tends to become equal to the reference. However, if only a small portion of the object being imaged by the camera is extremely bright, the average image signal level derived therefrom may be relatively high even though the majority of the object being imaged exhibits low light. Because of this disproportionate contribution of the small bright area to the average image signal level, the iris aperture may be reduced more than is desired. Consequently, the image signal level likewise is reduced in magnitude and the AGC circuit, even if supplied with high gain because of this reduced image signal level, may not be sufficient to compensate for this reduction in brightness. Therefore, the overall video picture which may be produced by this camera will be too dark.

If, instead of relying upon the average image signal level to control the iris, the peak level of the image signal is used, the iris may be subjected to a rapidly fluctuating control signal. But, the motor normally used to control the iris generally is not adequately responsive to a rapidly varying signal. Hence, satisfactory iris control may not be achieved by relying upon peak levels of the image signal.

OBJECTS AND SUMMARY OF THE INVENTION

Therefore, it is an object of the present invention to provide an improved iris control device which overcomes the aforenoted drawbacks and disadvantages of the prior art.

Another object of this invention is to provide an iris control circuit which is not erroneously affected by a small but bright portion of the image passing through that iris.

A further object of this invention is to provide apparatus for controlling the aperture of an iris in a camera which does not rely upon the average level of the image signal derived through that iris.

An additional object of this invention is to provide circuitry for controlling a camera iris as a function of the number of image signal samples which are produced during a predetermined interval that have magnitudes greater than a threshold level.

Yet another object of this invention is to provide iris control circuitry which uses an AGC circuit to produce an image signal, the gain of the AGC circuit being variable only when the iris approaches its fully opened condition.

Various other objects, advantages and features of the present invention will become readily apparent from the ensuing detailed description, and the novel features will be particularly pointed out in the appended claims.

In accordance with this invention, the aperture of an iris is controlled by sampling an image signal and detecting the difference between the number of samples produced during a predetermined interval that have magnitudes greater than a threshold level and a predetermined number. As such difference increases, the iris aperture is reduced; and, conversely, as such difference decreases or reverses its polarity, the iris aperture increases.

As an aspect of this invention, the image signal is sampled by digitizing. Preferably, digital techniques are used to determine the aforementioned difference, and that difference is converted to an analog signal for controlling the iris.

As another aspect of this invention, the aforementioned difference is integrated so as to avoid a rapidly fluctuating control signal from being supplied to the iris.

As yet another aspect of this invention, those samples which exceed approximately 70% of the maximum expected magnitude of the image signal are counted; and that count is compared to a preset count which is approximately equal to 70% of the total number of image signal samples produced during the aforementioned predetermined interval.

In the preferred environment, the camera with which the iris control apparatus is used is a video camera, and the aforementioned predetermined interval is a field interval.

As another feature of this invention, an automatic gain control (AGC) circuit is used to supply the image signal which is sampled. Preferably, the gain of the AGC circuit is fixed when the iris aperture operates through most of its range, but this gain is variable when the iris approaches its fully opened aperture.

As an aspect of this feature, the variable gain is produced by integrating the aforementioned difference between the count of samples having magnitudes greater than the threshold level and a preset count.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
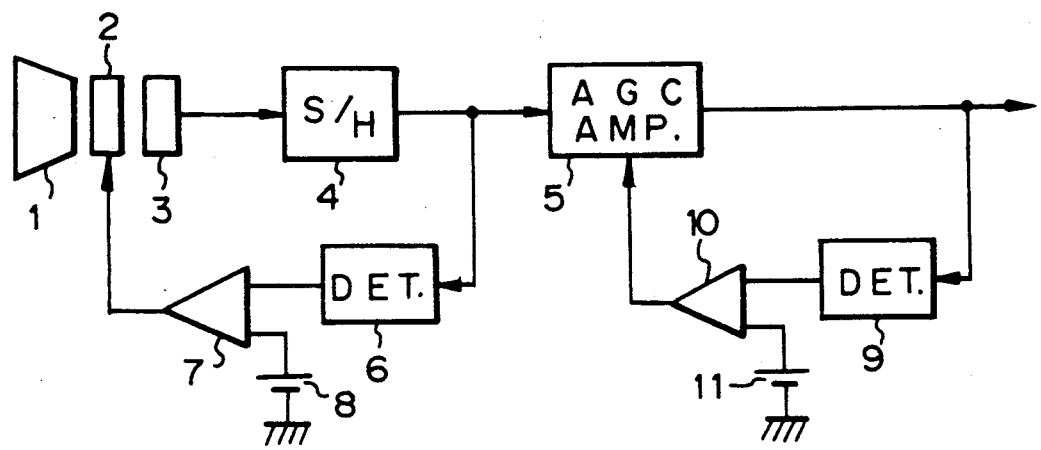
FIG. 1 is a block diagram of a prior art iris control circuit.

Before proceeding with a description of the present invention, the advantages obtained therefrom will best be appreciated by referring to a typical prior art iris control circuit, such as that shown in FIG. 1. A lens 1 is included in a camera and is used to focus an object through the controllable aperture of iris 2 onto a solid-state pick-up device 3. Preferably, pick-up device 3 is a CCD target known to those of ordinary skill in the art. In the interest of simplicity and brevity, the usual timing and control circuits used to scan the CCD target are not shown. It will be appreciated that the CCD target is scanned in a line-by-line manner to produce a raster of video signals supplied to a sample-and-hold circuit 4.

Typically, a color filter, such as an RGB filter, a complementary filter, or the like, is provided between lens 1 and target 3, this filter normally being disposed over the target. The purpose of the color filter is to separate the light image into its primary colors or, alternatively, into its complementary colors, as is conventional in a color video camera. Hence, sample-and-hold circuit 4 may be comprised of plural circuits, each adapted to sample a respective one of the color image signals produced on a line-by-line basis by CCD target 3. The magnitude of each color image signal is dependent upon the light level of the object being imaged and the aperture opening of iris 2. For convenience, the description herein refers to an image signal, but it will be appreciated that the image signal is comprised of plural color image signals, such as red, green and blue image signals.

A detector 6 is coupled to sample-and-hold circuit 4 and is adapted to detect the average level, or amplitude, of the samples produced by the sample-and-hold circuit. The detected average signal level is compared in a comparator 7 to a reference level 8 which, for example, may be equal to one-half (or any other desired portion) of the white level of a typical video picture. The output of comparator 7 is fed back to a suitable drive element (not shown) of iris 2. For example, the output of the comparator may be used to drive a motor which, in turn, opens and closes the iris.

The image signal samples produced by sample-and-hold circuit 4 also are coupled to an automatic gain control (AGC) amplifier 5 whose output supplies the image signal used by other processing circuitry (not shown). The gain of AGC amplifier 5 is controlled as a function of the amplitude of this output image signal. Accordingly, a detector 9 is connected to the output of AGC amplifier 5 to produce a signal proportional to the average signal level of the output image signal. This average signal level is compared to a reference level 11 by a comparator 10; and any difference therebetween is fed back to the AGC amplifier as a gain control signal.

In operation, if the brightness, or light level, of the object being imaged is too high, the average level of the samples produced by sample-and-hold circuit 4 exceeds the reference level produced by reference 8. Accordingly, comparator 7 feeds back an aperture-closing signal to iris 2. As a result, the iris aperture is reduced to correspondingly reduce the level of the samples produced by sample-and-hold circuit 4. Conversely, if the light level of the object being imaged is too low, detector 6 produces an average image signal level that may be less than the level of reference 8. Consequently, comparator 7 produces an aperture control signal which tends to open the iris aperture so as to increase the average amount of light which passes therethrough.

Similarly, if the average level of the output image signal produced by AGC amplifier 5 is too large, the average signal level produced by detector 9 exceeds reference 11 such that comparator 10 feeds back a gain-reducing control signal to the AGC amplifier. Conversely, if the average signal level of the output image signal produced by AGC amplifier 5 is too low, the average signal level produced by detector 9 may be less than reference 11, whereby comparator 10 feeds back a gain-increasing control circuit to the AGC amplifier. By reason of the AGC amplifier, if the object being imaged through iris 2 exhibits sufficiently low light such that the iris is opened to its maximum aperture, the gain of the AGC amplifier nevertheless may be increased to produce an output image signal of sufficient magnitude and thereby provide satisfactory detail in the video picture eventually reproduced therefrom.

However, since the feedback control signal supplied to iris 2 is dependent upon the average signal level of the samples produced by sample-and-hold circuit 4, if only a small portion of the object being imaged is very bright, the average image signal level may be unduly influenced thereby, causing a decrease in the iris aperture which makes the resultant video picture reproduced from the image signal too dark. That is, the majority of the object being imaged may exhibit relatively low light which, normally, would result in an opening of the aperture. But, since the average image signal level is used to control the iris, that average level may be increased because of an extremely bright but small portion of the imaged object. Moreover, since the gain of AGC amplifier 5 likewise is controlled as a function of the average image signal level, this improper decrease in iris aperture will not be compensated by an increase in AGC gain. Hence, the level of the output image signal produced by the AGC amplifier in response to the image samples derived through iris 2 may be too low and, therefore, the video picture which eventually is reproduced from that image signal will be too dark.

Figure 2:
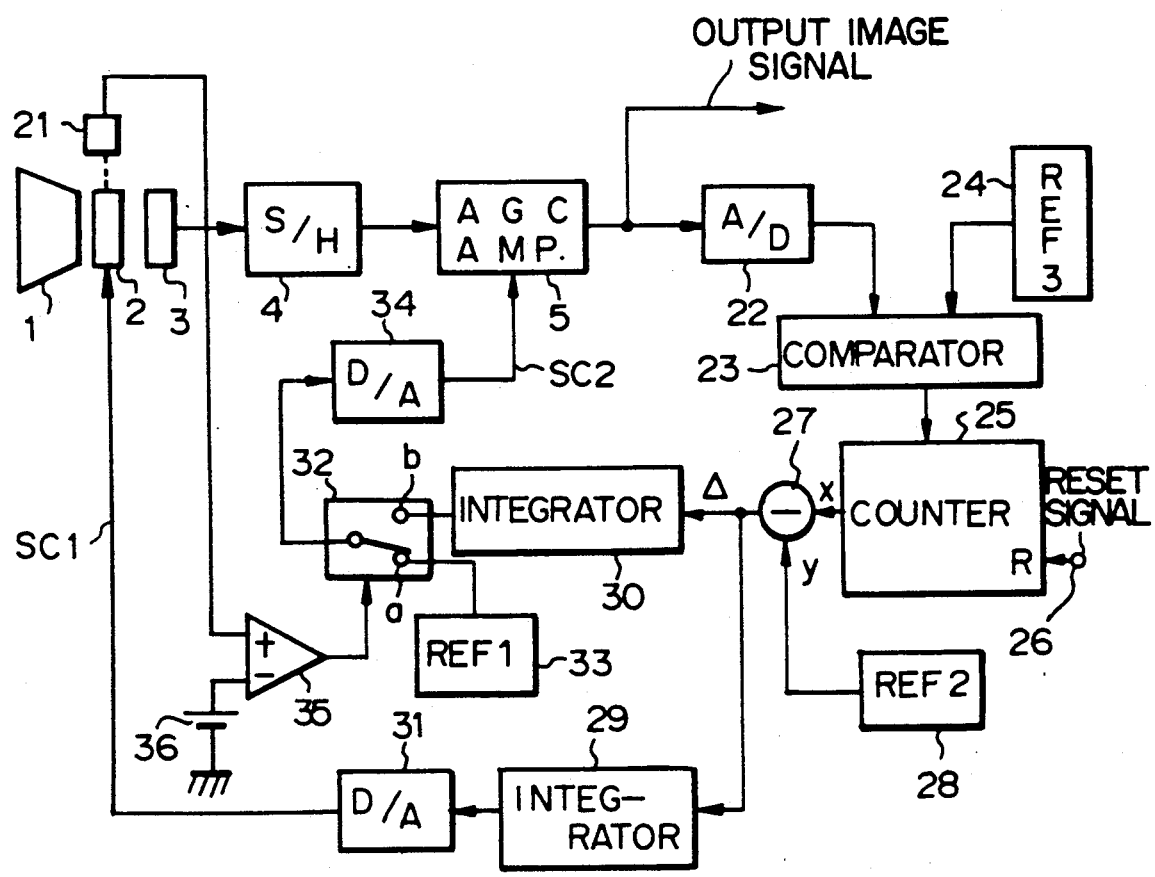
FIG. 2 is a block diagram of a preferred embodiment of the present invention.

Turning now to FIG. 2, there is illustrated a block diagram of a preferred embodiment of the present invention which overcomes the aforenoted disadvantages attendant the prior art iris control circuit shown in FIG. 1. In FIG. 2, the same reference numerals are used to identify the same component parts as shown in FIG. 1. Thus, a light image of an object is focused by lens 1 through the aperture of iris 2 onto a pick-up target 3 which produces a raster of video signals that are sampled by sample-and-hold circuit 4 and amplified by AGC amplifier 5. As before, pick-up target 3 preferably is a solid-state element, such as a CCD, and is adapted to produce a number of samples in successive lines. The CCD target is scanned in a conventional manner (neither shown nor described herein) to produce successive pixels on a line-by-line basis. For example, 525 lines each comprised of 720 pixels may be generated.

Also as before, a suitable color filter is disposed between lens 1 and CCD target 3 to produce individual color image signals. However, in the interest of brevity and simplicity, only one image signal is described herein. It will, of course, be appreciated that CCD target 3 is scanned at the conventional line and field rates. Accordingly, sample-and-hold circuit 4 produces samples of the pixels produced by the CCD target, and these pixel samples are supplied on a line-by-line basis.

The preferred embodiment of the iris control circuit in accordance with the present invention is comprised of an analog-to-digital (A/D) converter 22, a comparator 23, a counter 25, a difference circuit 27, an integrator 29 and a digital-to-analog (D/A) converter 31. In the illustrated embodiment, AGC amplifier 5 is supplied with a gain-setting signal produced by an integrator 30, a reference generator 33, a switch 32 and a digital-to-analog (D/A) converter 34. For convenience, reference first is made to the iris control circuit.

Referring to the iris control circuit, the sampled image signal produced by sample-and-hold circuit 4 and amplified by AGC amplifier 5 is supplied as an image signal to A/D converter 22. Each analog sample produced by the sample-and-hold circuit, that is, each analog pixel, is converted to digital form; and the resultant digitized samples are supplied successively to comparator 23. The comparator also is supplied with a reference magnitude, sometimes referred to herein as a threshold level, by a reference generator 24. In the embodiment described herein, reference generator 24 produces a digital signal representing a predetermined threshold level. As an example, the image signal derived from pick-up element 3 may be thought of as exhibiting a dynamic range from a low level, corresponding to black, to a high level, corresponding to white. If the low level is assumed to be 0% and the high level is assumed to be 100%, then the threshold level produced by reference generator 24 is approximately 70%. That is, the threshold level is approximately 70% of the maximum expected magnitude of the image signal.

Comparator 23 is adapted to compare each digitized sample produced by A/D converter 22 to the reference level produced by reference generator 24 and to indicate when the digitized sample exceeds the threshold level. For example, a binary "1" is produced by the comparator for each digitized sample having a magnitude greater than the threshold level. The output of the comparator is coupled to counter 25, and this counter is adapted to count each "1" supplied thereto. That is, the count of counter 25 is incremented whenever a digitized sample has a magnitude greater than the threshold level.

Counter includes a reset terminal 26 adapted to receive a reset signal periodically. In the preferred embodiment, the reset signal is produced in synchronism with the vertical synchronizing signal, thereby resetting the count of counter 25 at the beginning (or end) of each field interval. It is appreciated, therefore, that the count of counter 25 accumulates over a field interval, and this count x represents the number of digitized image signal samples produced during a field interval that had magnitudes greater than the threshold level of reference generator 24. This count x at the end of a field interval is compared in difference circuit 27 to a predetermined number y that is produced by a reference generator 28. Preferably, this predetermined number y is represented in digital form. In one example of the preferred embodiment, this predetermined number y is approximately 70% of the total number of image signal samples that are produced during a field interval. For example, if 720 pixels are produced for each scanned line in the video signal produced by pick-up element 3, and if 250 lines in each field interval represent useful image information, then the total number of image signal samples produced during a field interval is equal to $720 \times 250 = 180,000$, and reference generator 28 produces a digital signal representing the predetermined number $y = 70\% \times 180,000 = 126,000$. Difference circuit 27 compares the count x accumulated during a field interval to this predetermined number y.

The difference circuit is adapted to produce a difference signal $\Delta = (x - y)$; and this difference signal is coupled to integrator 29. It is expected that the difference signal $\Delta$ varies from field interval to field interval; and the purpose of integrator 29 is to smooth the fluctuations in this difference signal and thereby render it slowly varying. It is recalled that iris 2 is driven by a motor which is not readily responsive to a rapidly fluctuating drive signal. Integrator 29 removes those rapid fluctuations to which the iris drive motor may not respond. The integrated difference signal is supplied to D/A converter 31 whereat it is converted to an analog signal SC1 that is supplied to the iris drive motor (not shown).

Before describing the manner in which the iris control circuit operates, reference now is made to the AGC control circuit. The difference signal $\Delta$ produced by difference circuit 27 is supplied to another integrator 30 which is provided for substantially the same reason as integrator 29, that is, to smooth rapid fluctuations in the difference signal. The output of integrator 30 is coupled to one input b of a change-over switch 32. This switch is illustrated as an electromechanical switch, although it will be appreciated that, in a practical embodiment, switch 32 is constructed is a solid-state switch. Switch 32 includes another input a to which a reference generator 33 is connected. This reference generator provides a digital signal representing a fixed gain-determining level; and as will be explained, this level is used to establish a minimum gain for AGC amplifier 5.

Switch 32 selectively connects the output of integrator 30 or the fixed gain level produced by reference generator 33 to AGC amplifier 5 via D/A converter 34. Since the AGC amplifier preferably is an analog device, D/A converter 34 is used to convert the digital signal supplied thereto from integrator 30 or from reference generator 33 to a corresponding analog signal SC2. The switching state of switch 32 is determined as a function of the aperture of iris 2. A position detector 21, which may be a Hall effect sensor that cooperates with a magnetic element provided on the iris drive motor (not shown), supplies a signal to a comparator 35 representing the actual aperture opening of iris 2. This position signal is compared to a reference level produced by a suitable source 36 representative of an aperture opening that is almost equal to the maximum or fully opened aperture. Normally, comparator 35 is adapted to control switch 32 so as to supply the fixed gain level produced by reference generator 33 to AGC amplifier 5. However, when iris 2 is opened to a position that is almost equal to the fully opened condition of the iris, the signal produced by position detector 21 exceeds the reference signal produced by source 36 and comparator 35 changes over switch 32 so as to couple the output of integrator 30 to the AGC amplifier. Thus, the gain of AGC amplifier 5 remains fixed at its minimum gain until iris 2 is almost fully opened, whereupon the gain of the AGC amplifier is controlled by the difference signal $\Delta$ produced by difference circuit 27.

In operation, the pixel samples produced by sample-and-hold circuit 4 from the output of pick-up element 3 are digitized by A/D converter 22 and compared to the threshold level established by reference generator 24. As mentioned above, in one example, this threshold level is approximately equal to 70% of the video signal white level, that is, 70% of the maximum expected magnitude of the image signal. If the magnitude of the digitized image sample exceeds this threshold level, comparator 23 increments the count of counter 25.

At the end of a field interval, the count x of counter 25 is compared to the predetermined number y produced by reference generator 28. As mentioned above, in one example, this predetermined number y is approximately 70% of the total number of image signal samples produced during a field interval. Depending upon the magnitude of the difference signal $\Delta$, wherein $\Delta = (x - y)$, a signal of suitable magnitude and polarity is supplied as the iris drive signal SC1 by integrator 29 and D/A converter 31. For example, if the difference signal $\Delta$ is positive, the iris drive signal SC1 drives the iris motor (not shown) in a direction to reduce the iris aperture. This, in turn, reduces the intensity of the pixel samples that are compared by comparator 23 to the threshold level. If the aperture has been sufficiently reduced, the number of image signal samples having magnitudes equal to or greater than the threshold level will be reduced so as to correspondingly reduce the count x accumulated by counter 25. This, in turn, reduces the magnitude of the difference signal $\Delta$ which may discontinue a further decrease in the aperture of iris 2.

If the number of image signal samples produced during a field interval having magnitudes greater than the threshold level is less than the predetermined number y, the polarity of the difference signal $\Delta$ may be negative. Consequently, the iris drive signal SC1 drives the iris drive motor in a direction as to open the iris and thus increase the aperture. As a result, the intensity of the image signal samples derived from pick-up element 3 and supplied to comparator 23 will increase. Once again, the number of image signal samples produced during a field interval having magnitudes greater than the threshold level is compared to the predetermined number; and the difference therebetween is used to control the iris. By using integrator 29, rapid fluctuations in the difference signal $\Delta$ are smoothed and the iris motor need not respond to a rapidly changing drive signal SC1. It is appreciated that the iris control circuit illustrated in FIG. 2 attempts to establish the iris aperture such that the output of integrator 29 is effectively zero. That is, the aperture is controlled such that approximately 70% of the image signal samples produced during a field interval have magnitudes greater than 70% of the maximum expected image signal magnitude.

By controlling the iris as a function of the image signal samples produced during an entire field interval, the disadvantage of a disproportionate influence occasioned by a small but very bright portion of the object being imaged is avoided. Heretofore, such as in the circuit shown in FIG. 1, the iris has been controlled as a function of the average brightness of the imaged object. As mentioned previously, a small but bright portion of that object may result in a high average signal level over an entire field interval, even though only a relatively small number of image signal samples exhibit high magnitudes. By the present invention shown in FIG. 2, it is not the average object brightness which controls the iris but, rather, the actual number of image signal samples produced during a field interval that have high magnitudes which control the iris aperture. Consequently, an object exhibiting a generally low overall light level but having small portions which are very bright will not result in a reduced iris aperture. Hence, such an object exhibiting low light levels will not produce a video picture that is darkened even further.

In the circuit shown in FIG. 2, control of the iris has priority over control of the gain of AGC amplifier 5. During most operations, it is expected that the aperture of iris 2 is not fully opened. Hence, during most operations, position detector 21 produces a position signal that represents less than the fully opened position of the iris. This position signal is supplied to comparator 35 whereat it is compared to a reference signal produced by source 36 representative of the almost fully opened condition of the aperture. Consequently, when the aperture is not fully opened, switch 32 is controlled to couple the minimum gain determining signal from reference generator 33 to AGC amplifier 5. The AGC amplifier thus amplifies the pixel samples with constant gain. However, for low light conditions, iris 2 is driven to its almost fully opened position, as discussed above. At that time, the position signal produced by position detector 21 is equal to or greater than the reference signal produced by source 36 and, therefore, switch 32 is changed over to couple the output of integrator 30 to AGC amplifier 5. Under such low light conditions, or when the camera is imaging a dark object, the gain of AGC amplifier 5 is determined by the difference signal $\Delta$ produced by difference circuit 27.

While the present invention has been particularly shown and described with reference to a preferred embodiment, various changes and modifications may be made without departing from the spirit and scope of the invention. For example, the circuitry illustrated in FIG. 2 may be implemented by a suitably programmed microprocessor. Furthermore, the numerical examples which have been described above are to be construed simply as illustrative examples and are not intended to limit the present invention solely thereto. Other values may be used as the threshold level to which the magnitude of each digitized image signal sample is compared, and other predetermined numbers may be subtracted from the count accumulated by counter 25 so as to produce the difference signal $\Delta$. Still further, any desired aperture opening of iris 2 may be used as the reference which the iris position is compared for the purpose of changing over the gain setting signal supplied to AGC amplifier 5 from the fixed gain signal produced by reference generator 33 to the variable gain signal derived from the difference signal Δ by integrator 30. Still further, the samples which are compared to the threshold level produced by reference generator 24 may be obtained directly from the output of sample-and-hold circuit 4 rather than from the output of AGC amplifier 5. In that event, two separate circuits may be used to control the iris and the AGC amplifier, respectively: one circuit connected to the output of sample-and-hold circuit 4 and the other connected to the output of the AGC amplifier. Nevertheless, both circuits may be substantially the same and may be formed of an A/D converter, a comparator for comparing the magnitude of the digitized signals produced by the A/D converter to a threshold level, a counter for counting the number of samples whose magnitude exceeds the threshold level and a difference circuit for determining the difference between the count accumulated over a predetermined interval (e. g. the field interval) and a predetermined number.

It is intended that the appended claims be interpreted as including the embodiment described herein, those changes which have been discussed above and all equivalents thereto.

What is claimed is:

1. Apparatus for controlling the aperture of an iris in a camera, comprising: image means for producing an image signal; sampling means for sampling said image signal; detecting means for detecting the number (x) of image signal samples produced during a predetermined interval that have magnitudes greater than a threshold level; difference means for determining the difference between said number (x) and a predetermined number (y); and iris control means for controlling the aperture of said iris as a function of said difference.

2. The apparatus of claim 1 wherein said sampling means comprises digitizing means for generating digital samples of said image signal.

3. The apparatus of claim 2 wherein said difference means produces a digital difference signal; and said iris control means comprises analog drive means for opening and closing said iris, and digital-to-analog converting means for converting said digital difference signal to an analog drive signal and for supplying said analog drive signal to said drive means.

4. The apparatus of claim 1 wherein said iris control means comprises drive means for closing said iris when $x > y$ and for opening said iris when $x < y$.

5. The apparatus of claim 4 wherein said drive means includes integrator means coupled to said difference means for integrating the difference between said number (x) and said predetermined number (y).

6. The apparatus of claim 1 wherein said threshold level is approximately 70% of the maximum expected magnitude of said image signal.

7. The apparatus of claim 1 wherein said predetermined number (y) is approximately 70% of the image signal samples produced during said predetermined interval.

8. The apparatus of claim 1 wherein said camera comprises a video camera, said image signal comprises a video signal and said predetermined interval comprises a field interval.

9. The apparatus of claim 8 wherein said image means comprises solid state pick-up means for producing successive pixels on a line-by-line basis to provide a raster of pixels, and automatic gain control (AGC) amplifier means for amplifying said pixels to supply said sampling means with amplified pixels.

10. The apparatus of claim 9 further comprising fixed gain setting means for establishing a fixed gain for said AGC amplifier means, variable gain setting means for establishing a variable gain for said AGC amplifier means, and means for supplying said AGC amplifier means with said fixed gain except when the iris is opened to a predetermined aperture whereupon said variable gain is supplied to said AGC amplifier means.

11. The apparatus of claim 10 wherein said variable gain setting means comprises integrator means coupled to said difference means for integrating the difference between said number (x) and said predetermined number (y) to produce a variable gain signal.

12. The apparatus of claim 11 wherein said means for supplying comprises aperture sense means for sensing the aperture of said iris, and switch means actuated by said aperture sense means to couple said fixed gain or said variable gain signal to said AGC amplifier means.

13. The apparatus of claim 12 wherein said aperture sense means senses when said iris is in its almost full open position to actuate said switch means to couple said variable gain signal to said AGC amplifier means.

14. Apparatus for controlling the aperture of an iris in a video camera, comprising: solid-state pick-up means for producing successive pixels on a line-by-line basis representing an image; automatic gain control (AGC) amplifier means for amplifying said pixels; detecting means coupled to said AGC amplifier means for detecting the difference between the number of pixels produced during a predetermined interval that have magnitudes greater than a threshold level and a predetermined number and for providing a difference signal representative thereof; iris control means for controlling the aperture of said iris as a function of said difference signal; and gain setting means for setting the gain of said AGC amplifier means with a fixed gain until the aperture of said iris is almost fully opened and for thereafter setting the gain of said AGC amplifier means with a variable gain that is a function of said difference signal.

* * * * *